United States Patent Office 3,151,896
Patented Oct. 6, 1964

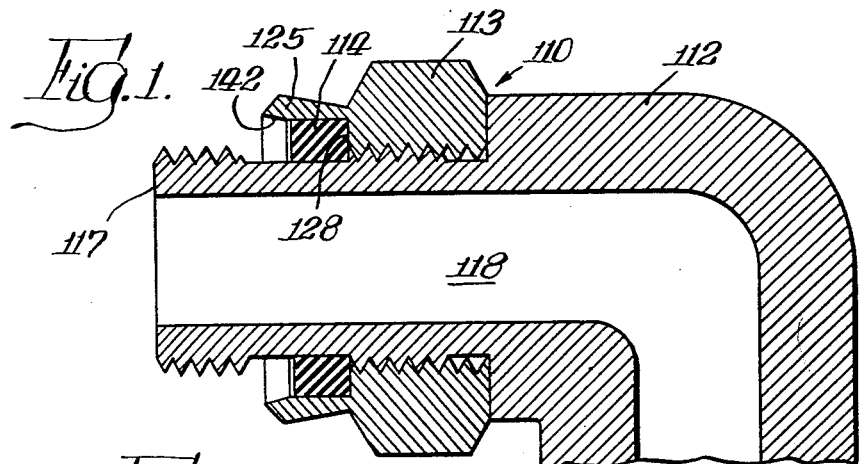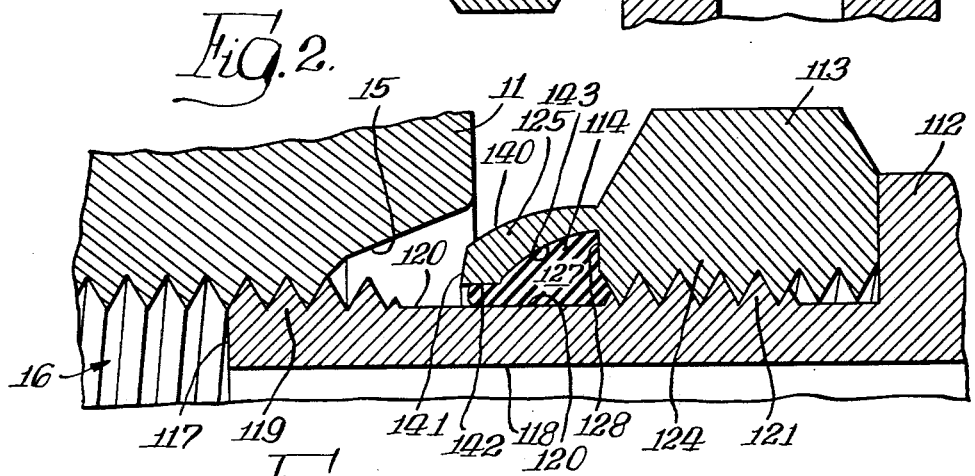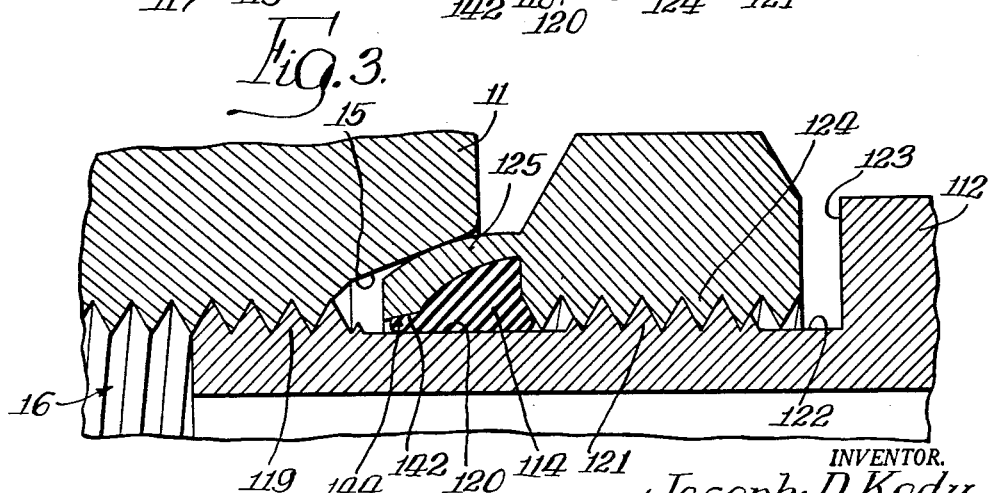

3,151,896
ROTATIONALLY ADJUSTABLE FITTING
Joseph D. Kody, Arlington Heights, Ill., assignor to Imperial-Eastman Corporation, a corporation of Illinois
Filed Oct. 24, 1960, Ser. No. 64,442
8 Claims. (Cl. 285—212)

This invention relates to fittings and in particular to fittings, such as elbows, requiring a sealing connection of the fitting to means defining a port with the fitting in any one of a plurality of rotational positions relative to the axis of the port.

The present invention comprises a modification of the fitting disclosed and claimed in copending George E. Franck application Serial No. 839,436, now Patent No. 3,101,206, for a rotationally adjustable fitting, filed September 11, 1959, and owned by assignee hereof.

The principal object of the present invention is to provide a new and improved elbow type fitting for use with a conventional port defining means.

Another object is to provide such a fitting having new and improved sealing means.

A further object of the invention is to have such a fitting having a new and improved deflectible nut portion structure for cooperating with an annular seal of the fitting.

A still further object is to provide such a fitting having reduced axial extent.

A yet further object of the invention is to provide such a fitting providing an improved positive seal which may be repetitively remade.

Other features and advantages of the invention will be apparent from the following description taken into connection with the accompanying drawing wherein:

FIGURE 1 is a fragmentary diametric section of a fitting embodying the invention;

FIGURE 2 is an enlarged, fragmentary diametric section thereof with the elements of the fitting arranged as preparatory to making-up the connection and in association with a portion of the port defining means; and FIGURE 3 is a view similar to that of FIGURE 2 but with the elements of the fitting arranged as upon completion of the make-up of the connection.

In the exemplary embodiment of the invention as disclosed in the drawing, a fitting generally designated 110 is shown to comprise a fitting generally similar to fitting 10 of the above identified George E. Franck application. The fitting 110 is arranged for connection to a conventional port defining means 11 comprising a S.A.E. standard boss, including an outwardly widening frusto-conical cam surface 15 and a threaded bore 16 opening into the cam surface 15.

Fitting 110 includes a tubular elbow member 112, a nut 113 threadedly secured to the elbow member 112 and a sealing ring 114. Fitting 110 is threadedly secured to the port means by threading the elbow member 112 thereinto and adjusting the elbow member to the desired rotational position relative to the axis of the port. Nut 113 is then advanced into the port while the elbow is retained in the desired position to effect a seal between the elbow and the port defining means.

Elbow 112 includes an inner end 117 and a bore 118 opening through inner end 117 to communicate with the bore 16 of the port means 11. The inner portion 119 of the elbow is exteriorly threaded for engagement with the port threaded bore 16, the axial length of threaded portion 119 being substantially less than the axial length of corresponding inner threaded portion of the fitting of said Franck application. The elbow further includes an exteriorly cylindrical intermediate portion 120 and an exteriorly threaded outer portion 121 generally similar to but substantially shorter than the outer threaded portion of the fitting of said Franck application. Outwardly of portion 121 the elbow is defined by an exteriorly cylindrical portion 122 having a diameter substantially equal to the diameter of cylindrical portion 120, and a radial axially outer shoulder 123.

Nut 113 includes an interiorly threaded outer portion 124 threadedly secured to threaded portion 121 of elbow 112 and having an axial length substantially less than the axial length of the corresponding threaded portion of the nut of said Franck application. Extending coaxially inwardly from nut portion 124 is an annular deformable portion 125. As shown in FIGURE 2, the deformable portion is originally provided to extend generally parallel to the axis of the nut, permitting the sealing ring 114 to be readily installed in the space 127 therein. The sealing ring, as provided by the manufacturer, is retained in association with the nut by crimping the deformable portion 125 to the arrangement of FIGURE 2, thereby providing an initial constrictive deformation of the deformable portion placing the sealing ring under an initial compressive stress.

The cross sectional configuration of the deformable portion 125 is best seen in FIGURES 2 and 3. More specifically, the exterior surface 140 of the deformable portion 125 is generally segmentally spherical, or rounded, when crimped to retain the seal 114 within the space 127. The outer end surface 141 of the deformable portion extends generally radially. A radially inward, generally cylindrical surface 142 extends longitudinally outwardly from surface 141 to a radially inward, generally segmentally spherical surface 143 extending outwardly to a radially outer shoulder 128 defining the outer end of space 127 adjacent the deformable portion. The deformable portion 125 thickens axially inwardly toward surfaces 141 and 142 and thus the curvatures of the surfaces 140 and 143 are slightly different. As best seen in FIGURE 3, the maximum diameter of outer surface 140 is no greater than the maximum or axial outer diameter of the port surface 15 thereby permitting a major portion of the deformable portion 140 to be disposed within the port 16, and more specifically radially within surface 15 thereof, upon initial engagement with the deformable portion with the cam surface. Thus, the deformable portion effectively seats relatively fully within the port, effectively minimizing the torque required to obtain a positive seal and permitting facilitated positioning of the elbow.

Sealing ring 114 comprises a split ring formed of a corrosion resistant material such as nylon or glass fiber filled nylon, or where high temperatures are encountered the ring may be formed of a thermosetting plastic such as asbestos filled phenolic resin. As shown, the sealing ring has an uncompressed longitudinal extent slightly less than the undeformed axial length of the deformable portion 125 between the surface 128 and the outer end of the surface 142. The sealing ring preferably has an outer diameter substantially equal to the surface 143 prior to crimping and an inner diameter substantially equal to the diameter of cylindrical surface 120.

As best seen in FIGURE 3, upon completion of the make-up of the fitting, the deformable portion is deflected inwardly by its engagement with cam surface 15 to cause radial surface 142 to be juxtaposed to surface 120 of the elbow, and widen frusto-conically outwardly, or toward seal 114. This rearrangement of surface 142 causes it to bear against the axially inner portion 144 of the seal with radially inwardly and axially outwardly directed forces against the nut portion 124 and the elbow surface 120 respectively to insure an effectively positive sealing engagement with the threaded portion 124 of the nut as well as with surface 128 thereof, and with surface 120 of the elbow. Thus, less accurate tolerances in the manufacture of the seal 114 may be used while yet an effectively positive seal is obtained therewith. Further, as surface 142 has a substantial area, the seal portion 144 cooperates therewith to provide an effectively positive limitation on the inward deflection of the deformable portion 125 as a result of the relatively incompressible characteristic of the seal. As the force is distributed over a substantial portion of the seal comprising portion 144, damage to the seal is effectively precluded permitting repetitive make-ups at maximum torque as desired. Further as the distal end of the deformable portion does not dig into the cylindrical surface 120 and thusly does not score the surface 120, such repetitive make-ups of the fitting may be made with the nut at different axial positions relative to the surface 120, as may be required where the elbow may be threaded into the port defining means to a greater or lesser extent in the successive assemblies.

As the deformable portion 125 is connected to the thick portion 124 of the nut at the thinnest end of the deformable portion, facilitated inward deflection of the deformable portion is obtained. However, as the engagement of the deformable portion with the cam surface 15 occurs at a distance from the plane of surface 128 where the deformable portion is relatively thick, a positive high pressure seal is obtained between surfaces 140 and 15.

The relatively short axial extent of the nut portion 124 permitted by the increased degree of insertion of the deformable portion 125 into the port 16 at the initial contact with the surface 15, effectively reduces vibration as the outer end of the elbow 112 may be disposed closer to the port means 11. Further, the over-all size of the fitting is reduced permitting reduced cost. Additionally, the improved structure of fitting 110 effectively retains extremely high pressure while permitting facilitated adjustability of the elbow portion.

While I have shown and described one embodiment of the invention, it is to be understood that it is capable of many modifications. Changes, therefore, in the construction and arrangement will be made without departing from the spirit and scope of the invention as defined in the appended claims.

I claim:
1. In a fitting for use with a conventional port means having an annular outwardly widening cam surface and a threaded bore opening into said cam surface, said fitting comprising: a body member having an inner end, an exteriorly threaded, axially inner portion adapted to be threadedly secured to said port means in the threaded bore thereof, an exteriorly cylindrical intermediate portion extending coaxially outwardly from said inner portion, an exteriorly threaded outer portion extending coaxially outwardly from said intermediate portion, and a bore extending coaxially through said body member portions and opening through said inner end; a nut having an interiorly threaded, axially outer portion threaded onto said outer portion of the body member, and an annular deformable portion extending coaxially inwardly from said outer portion of the nut and spaced coaxially radially outwardly of said cylindrical intermediate portion of the body member, said deformable portion increasing in radial thickness longitudinally inwardly from said nut and having an outer portion defining a first, annular radially inwardly facing pressure surface and a distal inner end defining a second, annular radially inwardly facing pressure surface, said pressure surfaces cooperatively defining with the cylindrical intermediate portion of the body member in the made-up arrangement of the fitting a compression space, the radial distance from said cylindrical intermediate portion of the body to a line on said second pressure surface defining the minimum radial dimension of said surfaces defining said space; and a resilient annular seal formed of a deformable, extrusion resisting material disposed coaxially between said deformable portion of the nut and said intermediate portion of the body member and being so dimensioned that in the made-up arrangement of the fitting it is sealingly compressed between said pressure surfaces and said cylindrical intermediate portion, said deformable portion being radially inwardly deflected by engagement thereof with said port cam surface to a disposition wherein said second pressure surface extends generally parallel to and is closely circumjacently spaced from said intermediate cylindrical surface of the body member to provide therebetween a first, localized maximum-pressure seal of the nut to the body member, and said first pressure surface is spaced further from said intermediate portion of the body to provide therebetween a second, lesser-pressure seal of the nut to the body member.

2. The fitting of claim 1 wherein the seal completely fills the compression space between said first pressure surface and said intermediate portion of the body.

3. The fitting of claim 1 wherein said second pressure surface widens axially outwardly in the made-up arrangement of the fitting for effectively urging the seal axially outwardly and radially inwardly.

4. The fitting of claim 1 wherein said interiorly threaded portion of the nut extends to closely adjacent said exteriorly cylindrical intermediate portion of the body in the made-up arrangement of the fitting.

5. The fitting of claim 1 wherein said pressure surface is originally formed to define an inwardly widening surface for facilitated insertion of the seal to within said compression space.

6. The fitting of claim 1 wherein said first pressure surface of said deformable portion is generally segmentally spherical.

7. The fitting of claim 1 wherein said seal is formed of a material having a resistance to extrusion at least such as that of nylon.

8. The fitting of claim 1 wherein said seal further is dimensioned and said pressure surface is cooperatively disposed to compress said seal to a preselected limit providing a sensible hit-home indication of the completion of the make-up of the fitting.

References Cited in the file of this patent

UNITED STATES PATENTS

| | | |
|---|---|---|
| 1,983,840 | Dohner | Dec. 11, 1934 |
| 2,342,425 | Parker | Feb. 22, 1944 |
| 2,343,235 | Bashark | Feb. 29, 1944 |
| 2,473,618 | Stillwagon | June 21, 1949 |
| 2,588,372 | Erb | Mar. 11, 1952 |
| 2,688,497 | Brisack | Sept. 7, 1954 |
| 3,003,795 | Lyon | Oct. 10, 1961 |
| 3,025,084 | Frank | Mar. 13, 1962 |
| 3,101,206 | Frank | Aug. 20, 1963 |